United States Patent [19]
Brooks et al.

[11] Patent Number: 5,548,457
[45] Date of Patent: Aug. 20, 1996

[54] DISK DRIVE DISK STACK CLAMP

[75] Inventors: Peter E. Brooks, Rochester; David F. Glaess, Rochester, both of Minn.

[73] Assignee: International Business Machines Corporation, Armonk, N.Y.

[21] Appl. No.: 314,577

[22] Filed: Sep. 28, 1994

Related U.S. Application Data

[63] Continuation of Ser. No. 976,119, Nov. 13, 1992, abandoned.

[51] Int. Cl.⁶ .................................................. G11B 17/02
[52] U.S. Cl. ........................... 360/98.08; 360/99.12
[58] Field of Search .................... 360/97.01, 98.01, 360/98.07, 98.08, 99.08, 99.12; 369/270, 271

[56] References Cited

U.S. PATENT DOCUMENTS

| | | | |
|---|---|---|---|
| 3,587,073 | 6/1971 | Ghose | 360/98.08 |
| 3,854,347 | 12/1974 | Hellerich | 360/98.08 |
| 4,205,357 | 5/1980 | Barton et al. | 360/98.08 |
| 4,680,656 | 7/1987 | Manzke et al. | 360/98.08 |
| 4,683,505 | 7/1987 | Schmidt et al. | 360/98.08 |
| 4,717,977 | 1/1988 | Brown | 360/98.08 |
| 4,739,425 | 4/1988 | Dierkes et al. | 360/98.08 |
| 4,775,906 | 10/1988 | Suzuki et al. | 360/98.08 |
| 4,918,545 | 4/1990 | Scheffel | 360/98.08 |
| 5,006,942 | 4/1991 | Brooks et al. | 360/98.08 |
| 5,031,061 | 7/1991 | Hatch | 360/98.08 |
| 5,101,306 | 3/1992 | Johnson | 360/99.12 |
| 5,148,338 | 9/1992 | Frugé | 360/98.07 |
| 5,243,481 | 9/1993 | Dunckley et al. | 360/98.08 |

OTHER PUBLICATIONS

IBM Technical Disclosure Bulletin, vol. 20, No. 10, Mar. 1978, Beye.
IBM Technical Disclosure Bulletin, vol. 26, No. 10B, Mar. 1984, pp. 5444–5446, entitled "Zero Droop Disk Clamping Assembly" by K. D. Allen et al.

*Primary Examiner*—Jefferson Evans
*Attorney, Agent, or Firm*—Richard E. Billion

[57] ABSTRACT

A clamp ring for clamping disks to a rotating hub includes a inner diameter leg portion, a cross member portion and a disk contacting portion. A cross sectional view of the clamp ring is N-shaped. The clamp ring is heated so that it thermally expands to a diameter that is larger than the outer diameter of the hub. A thermally expanded clamp ring is placed on the top of the disk stack which has at least one disk. An axial load is placed on the inner diameter leg portion as the clamp ring cools. The inner diameter grips the hub as it cools. The cross member is compressed as the clamp ring cools. The disk contacting portion moves slightly as the clamp ring cools. This movement counteracts the outward movement of the disk contacting portion of the clamp during loading resulting in little tendency to cone the disk. The result is a disk stack clamped without a resulting radial load on the disks.

23 Claims, 4 Drawing Sheets

5,548,457

DISK DRIVE DISK STACK CLAMP

This is a continuation of application Ser. No. 07/976,119, filed on Nov. 13, 1992, now expressly abandoned.

BACKGROUND OF THE INVENTION

1. Field of the Invention

This invention relates to a disk drive having at least one rotating memory disk. More particularly, this invention relates to a clamp and method of clamping one or more rotating memory disks to a hub and spindle to form a disk stack in which the disk distortion is minimized or substantially eliminated.

2. Description of the Prior Art

Many disk drives include more than one disk. The disks are typically stacked on a hub. The hub has a lip which typically is on one end of the hub and contacts the surface of the first disk near the inner diameter of the disk. Between each disk is a spacer. The disks and spacers are generally referred to as the disk stack. The term disk stack also applies to a disk drive having only one disk and no spacer. The disk clamp provides a compressive load on the disk stack to hold the disks in place. The compressive load acts on the inner diameter of the disk or disks in the disk stack and is in a direction which is parallel to the axis of the hub. Many refer to this compressive load as an axial load since it acts in the axial direction.

Clamps for disk stacks come in a variety of configurations. In the past, some disk clamps have provided the axial load using screws that are passed through a circular plate into tapped openings in the hub. This configuration had several problems. The circular plate and screws add height to the disk stack. The move to make smaller, shorter disk drives made this arrangement undesirable. In addition, as the disks themselves became thinner, the individual screws produced localized stresses which had the effect of causing the disks to distort at the inner diameter. The disk actually became wavy at the inner diameter. Many in the industry referred to the resulting distorted shape as "potato chipping" because of the resemblance of the disk's shape to a potato chip. Usually, there are as many lobes in the potato chip as there are screws. In many disk drives the transducer is passed over the disk. Ideally, the height between the transducer and disk should be uniform. When potato chipping occurs on a disk, the fly height varies and the data channel must compensate for the variation in the signal from the transducer.

Other clamp configurations include a disk or bell-shaped part that acts as a spring. A screw or screws are passed through openings in the center of the disk or bell-shaped part and into a tapped opening in the hub. This design also has problems. Providing a hub with enough material for a tapped opening requires height. In addition, attaching the screw or screws at the center of the hub causes the disk or bell-shaped part to flatten as the screw is tightened. The edges of the disk or bell-shaped part which contact the disk during tightening move across the surface of the disk in a radially outward direction. The movement of the disk clamp with respect to the disk causes distortion which makes the disk become conical in shape. Many of these disk clamps had square edged perimeters which contacted the disk. Other configurations of the clamps have rounded edges which contact the disk. Both of these configurations produce radial loads on the disk as the clamp moves with respect to the disk. The result is coning of the disk. Others refer to this distortion problem as disk droop.

Another disk clamp is a heat-shrink ring which is attached to the top of the hub. No screws are used. A ring is heated so that it expands and the inner diameter is greater than the outer diameter of the hub. A tool is used to transfer the heated ring to the top of the disk stack and to apply a clamping force to the heated ring. The clamping force is maintained on the ring as it cools. This type of disk clamp also results in coning of the disk. As the clamp load is applied to the clamp the edge of the clamp ring moves radially outward across the surface of the disk. When the heat-shrink ring cools, the edge of the ring moves inward across the disk surface near the inner diameter. The inward motion is smaller in magnitude than the outward motion and the resulting relative displacement between the disk and the ring results in a radial load on the surface of the disk that cones the disk.

Any distortion due to clamping is undesirable. The slider and transducer do not maintain a constant flyheight in the presence of the potato chip type disk distortion. A valley causes the slider and attached transducer to fly low while a hill causes the slider and attached transducer to fly high. In the presence of a coning type disk distortion, the flyheight is too high on one side of the disk and too low on the other side of the disk. The flyheight may be constant but will vary from the nominal, designed flyheight.

Several clamps have addressed the problem of disk distortion. In Scheffel U.S. Pat. No. 4,918,545, the clamp shown clamps the disk pack without placing a radial load on the disks in the disk stack. The clamp requires an additional spacer ring on the top of the disk stack about which a portion of the rim 25 rotates. The spacer ring 21 provides a pivot point about which the rim of the clamp rotates. The clamping force is provided by placing a screw through the clamp and into a tapped opening in the hub. The additional spacer ring and the screw into the hub each result in additional height which is undesirable. A clamping arrangement taught in IBM Technical Disclosure Bulletin, vol. 26, No. 10B, March, 1984, pp. 5444–5446, entitled "Zero Droop Disk Clamping Assembly", does not eliminate placement of a radial load on the disks but rather shifts the geometry of the hub to accommodate it.

As a result, there is a need for a disk clamp and clamping method which minimizes disk distortion while also minimizing the amount of height needed to accommodate the clamp.

SUMMARY OF THE INVENTION

The disk clamp disclosed allows clamping of the disk stack with minimal disk distortion and also accomplishes this while using minimum amounts of heighth. The disclosed clamp ring for clamping disks to a rotating hub includes an inner diameter leg portion, a cross member portion, and a disk contacting portion. A cross sectional view of the clamp ring is N-shaped. The clamp ring is heated so that it thermally expands to a diameter that is larger than the outer diameter of the hub. A thermally expanded clamp ring is placed on the top of the disk stack which has at least one disk. An axial load is placed on the inner diameter leg portion as the clamp ring cools. The inner diameter grips the hub as it cools. The cross member is compressed as the clamp ring cools. The disk contacting portion moves slightly as the clamp ring cools. This movement counteracts the outward movement of the disk contacting portion of the clamp during loading resulting in little tendency to cone the disk. The result is a disk stack clamped without a resulting radial load on the disks.

BRIEF DESCRIPTION OF THE DRAWINGS

For a better understanding of the present invention, reference can be made to the accompanying drawings, in which.

These drawings are not intended as a definition of the invention but are provided solely for the purpose of illustrating the preferred embodiment of the invention described below.

DETAILED DESCRIPTION OF THE PREFERRED EMBODIMENT

Figure 1:
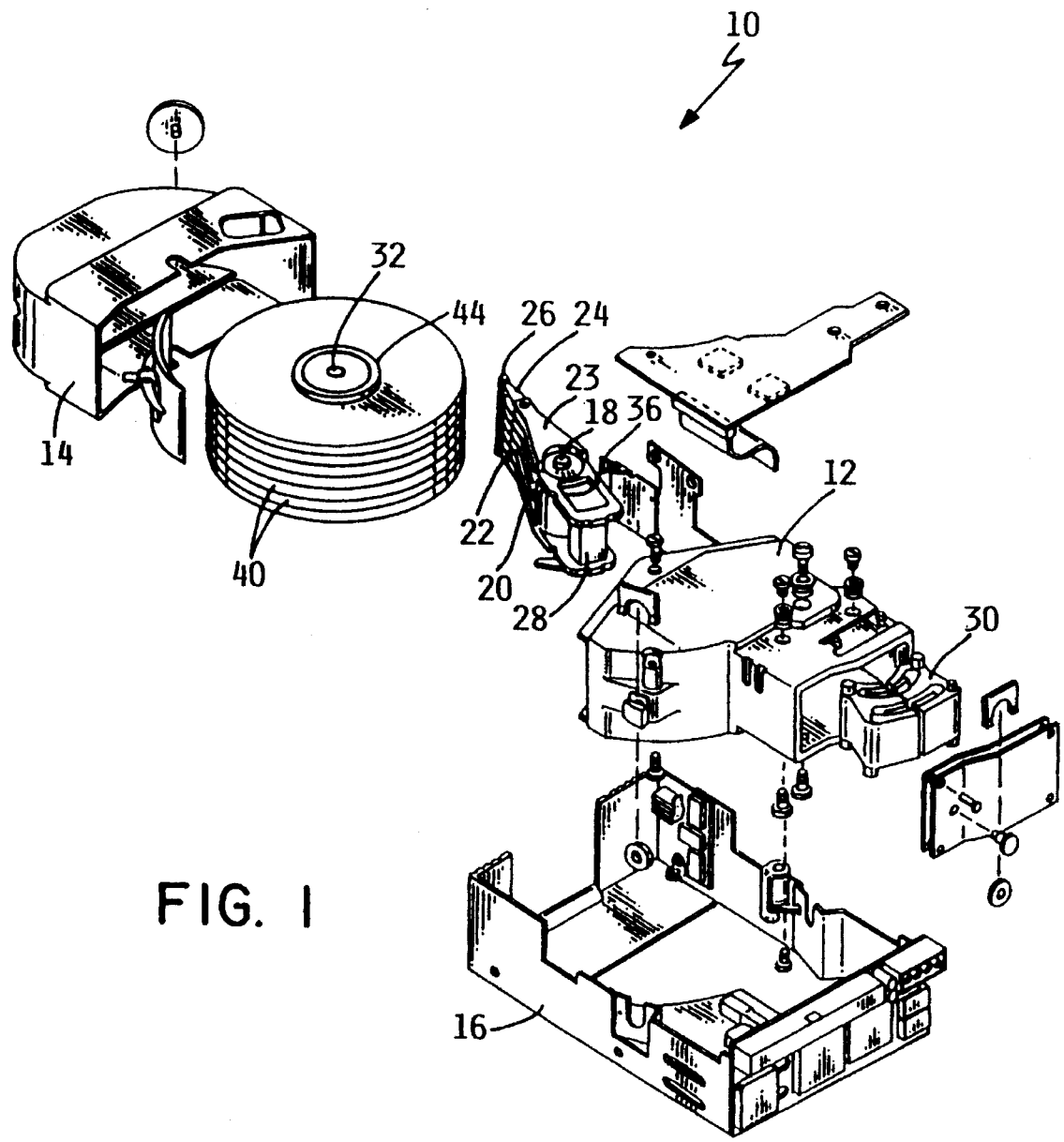
FIG. 1 is an exploded view of a disk drive which shows the disk clamp used on the disk stack.

The invention described in this application is useful with all mechanical configurations of disk drives or direct access storage devices ("DASD"). FIG. 1 is an exploded view of a disk drive 10. It should be noted that although a rotary actuator is shown, the invention described herein is applicable to disk drives with linear actuators. The disk drive 10 includes a housing 12, and a housing cover 14 which, after assembly, is mounted within the frame 16. Rotatably attached to the housing 12 on an actuator shaft 18 is an actuator arm assembly 20. One end of the actuator arm assembly 20 includes an E block or comb like structure 22 having a plurality of arms 23. Attached to the separate arms 23 on the comb or E block 22, are load springs 24. Attached at the end of each load spring is slider 26 which carries a magnetic transducer (not shown in FIG. 1). On the other end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator assembly 20 to rotate it about the actuator shaft 18. Also mounted within the housing 12 is a spindle shaft 32. Rotatably attached to the spindle shaft 32 is a hub 33. Attached to the hub 33 are a number of disks 34. In FIG. 1, eight disks are attached to the hub 33 are attached to the hub 33 in spaced apart relation. It should be noted that the clamp described in this application is applicable to a disk stack having any number of disks. Also shown in FIG. 1, is a flexible cable 36 which carries electrical signals to and from the actuator arm assembly 20.

Figure 2:
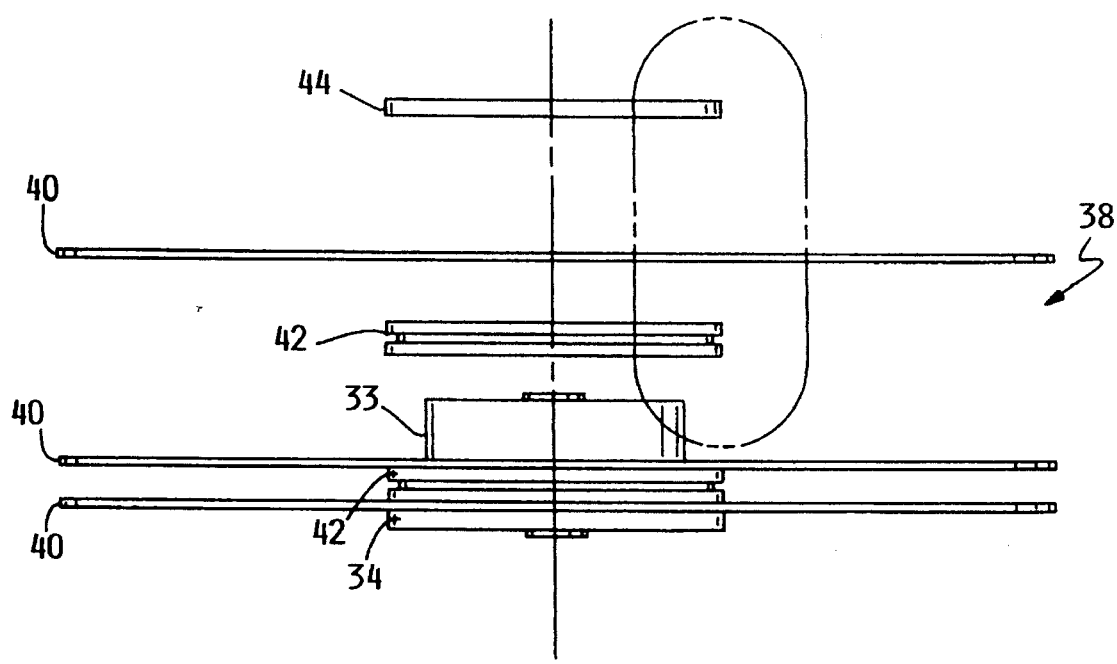
FIG. 2 is an exploded view of a disk stack which uses the clamp ring described herein.

FIG. 2 shows an exploded view of a disk stack 38. The hub 33 includes a flange 34. A disk 40 is placed onto the flange 32 of the hub 33. Next a spacer ring 42 is placed onto the first disk 40. The disk stack 38 is constructed with alternate disks 40 and spacer rings 42 until the designed number of disks comprise the disk stack 38. The spacer rings 42 maintain a space between the disks 40 in the disk stack 38. FIG. 2 shows a disk stack having three disks 40. On the last disk 40 in the disk stack 38, a clamp ring 44 is used to clamp the disks 40 and spacer rings 42 between the flange 34 of the hub 33 and clamp ring 44. It should be noted that a disk stack 38 having only one disk 40 would have no spacer ring 42 and that the hub 33 in a one disk stack would be shorter.

Figure 3:
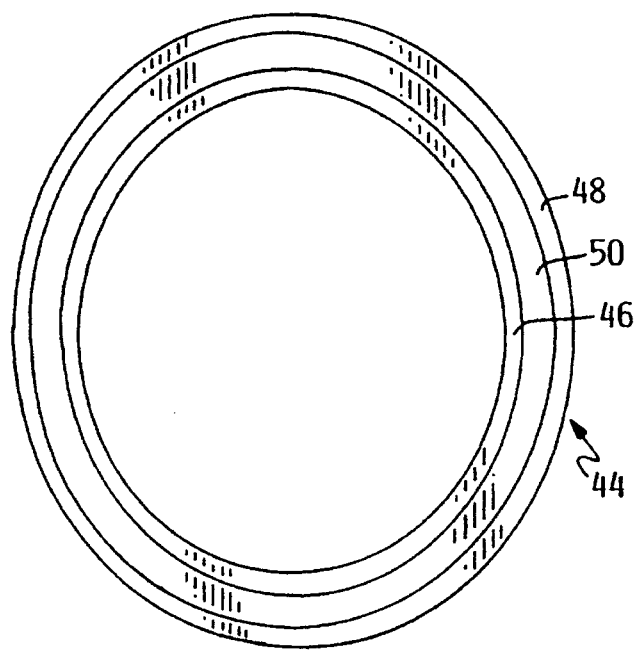
FIG. 3 is a top view of the clamp ring.
Figure 4:
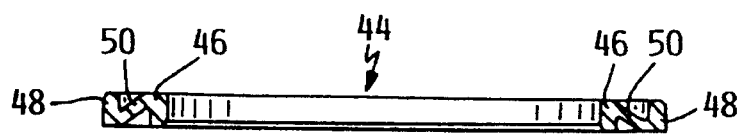
FIG. 4 is a cross-sectional side view of the clamp ring.
Figure 5:
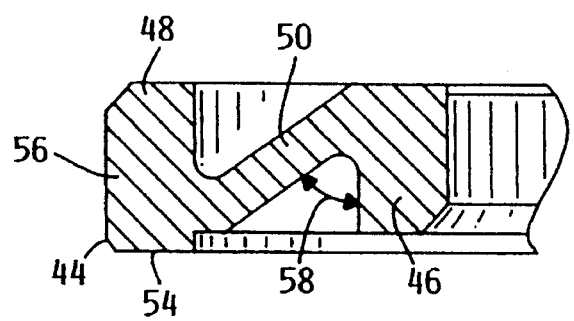
FIG. 5 is an enlarged cross-sectional view of the clamp ring.

Turning now to FIGS. 3, 4 and 5, the clamp ring 44 will be described in detail. The clamp ring includes an inner diameter portion or inner leg 46, and outer diameter portion or outer leg 48 and a compliant portion or cross member 50 which attaches the inner leg 46 and the outer leg 48. FIG. 5 shows the one portion of the clamp ring 44 in cross section. FIG. 5 shows that the clamp ring appears to be N-shaped in cross section. The inner diameter portion includes a hub gripping portion 52. The outer diameter portion or outer leg 48 includes a disk contacting portion 54 and a free end 56. The cross member or compliant section 50 angles from the portion of the outer leg 48 near the disk contacting portion 54 to the inner diameter portion or inner leg 46.

The angle 58 that the compliant section or cross member 50 makes with respect to the inner diameter portion or inner leg 46 and the outer diameter portion or outer leg 48 can be varied to vary the compliancy of the cross member 50 as can the thickness of the cross member 50. For example, a smaller angle 58 would result in a more upright N-shaped cross section which would be less compliant. A larger angle 58 would result in a flatter N-shaped cross section with the cross member 50 being more compliant than the clamp shown. The angle 58 determines the compliancy of the clamp ring 44 because the compliancy is determined by the amount of clamp material along a line parallel to the inner diameter portion of clamp ring 44 and passing through the cross member 50. At a smaller angle 58, the amount of material along this line is larger.

The angle 58 that the compliant section or cross member 50 makes with respect to the inner diameter portion or inner leg 46 and the outer diameter portion or outer leg can be varied to vary the amount of axial load that can be achieved without applying a preload to the clamp. For example, a smaller angle 58 would result in a more upright N-shaped cross section which would achieve greater zero-preload axial load. A larger angle 58 would result in a flatter N-shaped cross section with the cross member 50 achieving a smaller axial load with zero-preload. The angle 58 determines the zero-preload axial load of the clamp ring 44 because as the outer leg 48 contracts on cooling it compresses the cross member 50. This section can only support a compressive load along its length at an angle 58 resulting in an axial load that is inversely proportional to the tangent of angle 58.

In this particular embodiment, the clamp ring is made of aluminum and the angle 58 is approximately 56.8 degrees. The clamp ring provides approximately 80 pounds of force on a disk stack 38 of industry standard. 3.5 inch disks when no preload is applied to the clamp. The axial load has been measured as high as 300 pounds of force when the axial deflection between the inner and outer leg is 0.15 millimeters.

An overview of how the clamp ring 44 works will be provided in an initial paragraph. Several paragraphs will follow the overview paragraph and describe how the clamp ring 44 works in greater detail.

Figure 7:
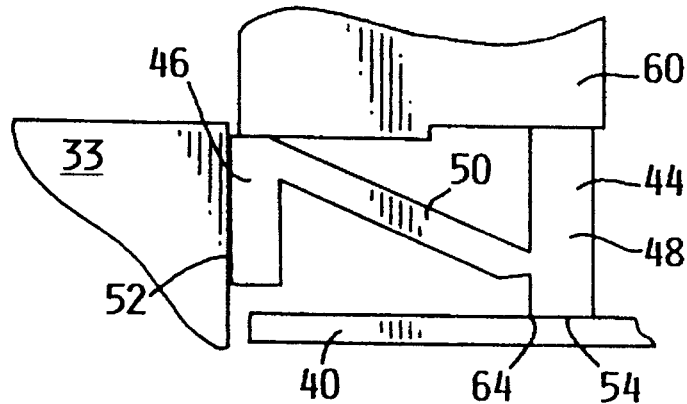
FIG. 7 is an exaggerated view of a heated disk clamp when it is loaded onto the disk stack.

After the disk stack 38 is formed by stacking disks 40 and spacer rings 42 on the hub 33, the clamp ring 44 is applied to complete the disk stack 38. The clamp ring 44 is heated so that the inner diameter of the clamp ring 44 is larger than the outer diameter of the hub 33. The heated clamp ring 44 is placed onto the top disk surface and a clamping load is applied to the clamp ring 44 by a loading mechanism 60 as shown in FIG. 7. The clamp ring 44 has much less mass than the hub 33 and the disks 40 comprising the disk stack 38. As a result, the clamp ring 44 cools quickly since the unheated hub and disks quickly dissipate the heat in the clamp ring 44. The hub gripping portion 52 of the clamp ring 44 contacts the hub 33 as a result of the pre-load and the contraction of the clamp ring during cooling. The inner diameter portion does not contact the disk 40. The disk contacting portion 54 of the outer leg or outer diameter portion of the clamp ring 44 contacts the disk 40.

Figure 6:
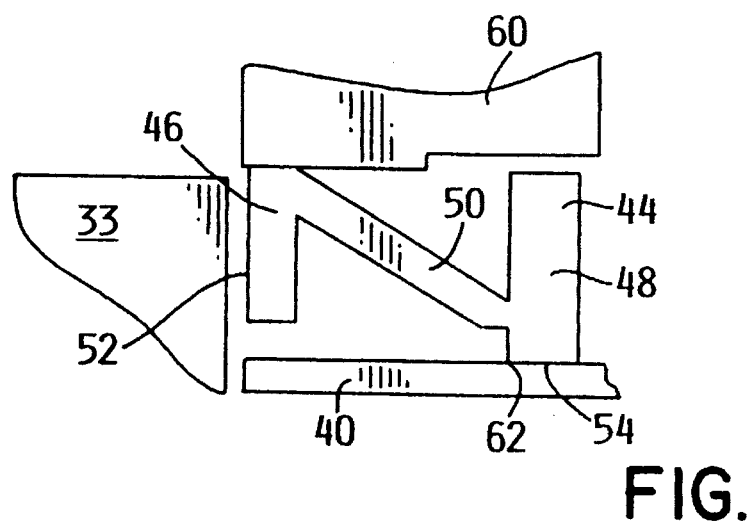
FIG. 6 is an exaggerated view of a heated disk clamp ring on a disk prior to loading.
Figure 8:
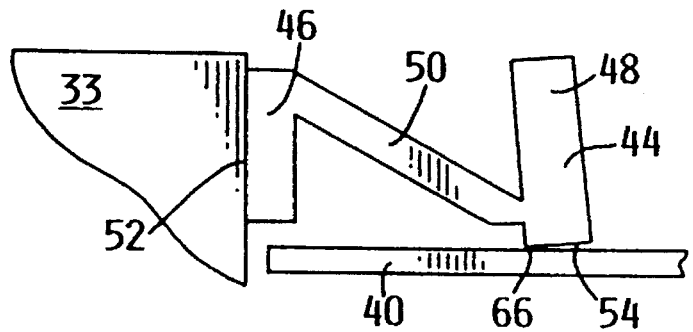
FIG. 8 is an exaggerated view of a disk clamp after it has cooled and the loading mechanism has retracted.

Now referring to FIGS. 6, 7 and 8, the details of how the N-shaped clamp ring 44 works will now be described. FIG. 6 shows the clamp 44 heated with the loading mechanism 60 in its initial configuration before any pre-load is applied to the clamp ring. This condition occurs only momentarily and is shown to illustrate the initial position, depicted by reference numeral 62, of the disk contacting portion 54 of the clamp ring 44.

FIG. 7 shows the heated clamp ring 44 loaded with the loading mechanism 60. The loading mechanism 60 places the load initially on the inner leg 46 as shown in FIG. 6, but as the load is increased, the outer leg 48 also becomes loaded. The hub gripping portion 52 of the inner leg 46 comes into contact with the hub 33 as the load is increased. The disk contacting portion 54 of the outer leg 48 is now in a second position, depicted by reference numeral 64, which is slightly farther away from the hub.

As the clamp ring 44 cools, the load is maintained on the clamp 44 by the loading mechanism 60. In addition, as the clamp cools, the contraction of the clamp to its original geometry is limited by interference with the motor hub. As shown in FIG. 8, as the clamp ring 44 cools, it initially grips the hub 33 at the hub gripping portion 52. Once this occurs, the compression forces in the cross member 50 increase. The disk contacting portion returns to point 66 which is at a distance from the hub approximately the same as point 62 and the disk 40 is not coned. The reason the disk remains flat is that the combination of the motions of the outer leg 48 during loading and during cooling return the contact point of the outer leg 66 after loading and cooling to substantially the same initial contact point 62 of the outer leg 48 prior to loading.

In addition, as the clamp cools, the contraction of the clamp to its original geometry is limited by interference with the motor hub. The outer leg 48 does not have the constraint of the motor hub to prevent it from returning to its original position. Rather, the outer leg 48 is constrained by the cross member 50. The cross member is, therefore, put into compression along its length. Since it is positioned at an angle to the surface of the disk, the load that it is supporting has a component in the axial direction. Therefore, even if the inner leg 46 were not deflected relative to the outer leg 48 by the loading mechanism 60 there is still an axial load on the disk stack once the clamp cools.

In summary, the clamp ring 44 moves through several states as it cools. The end result is that the final position 66 of the disk contacting portion 54 of the clamp ring 44 is positioned close to the initial position 62 with respect to the hub 33. Any difference in these positions, which would normally produce a friction force tending to cone the disk 40 is minimized. The clamp is designed so that the radial motion of the clamp/disk contact moves a minimal amount and so that an axial load is generated upon cooling even when there is no axial deflection of one part of the clamp to another.

The present invention and the best mode for practicing it has been described. It is to be understood that the foregoing description is illustrative only and that other means and techniques can be employed without departing from the full scope of the invention described in the appended claims.

What is claimed is:

1. A disk drive comprising:

a housing;

a spindle shaft mounted to said housing;

a hub attached for rotation to said spindle shaft, said hub including an outer cylindrical surface having a first diameter and a circular end and a flange end;

at least one disk having an opening therein with a second diameter, said first diameter and said second diameter being nearly equal, said at least one disk positioned on said flange end; and a one piece clamp ring for gripping the outer cylindrical surface of said hub at a portion having said first diameter and not extending beyond an upper end of said cylindrical surface of said hub, said clamp ring having an N-shaped cross-section for clamping at least one disk to said hub, a portion of said clamp ring for clamping said at least one disk, said clamp ring having an axis through the center of the ring.

2. The disk drive of claim 1 wherein the one piece clamp ring further comprises:

an inner diameter portion;

an outer diameter portion;

a cross member attached to the inner diameter portion and the outer diameter portion, said cross member attached at an angle with respect to the inner diameter portion and the outer diameter portion said cross member sloping toward the disk from said inner diameter toward said outer diameter, said cross member being more compliant in the axial direction than the inner diameter portion or the outer diameter portion of the clamp ring.

3. The disk drive of claim 2 wherein the inner diameter portion further comprises a hub gripping portion and the outer diameter portion further comprises a disk clamping portion.

4. The disk drive of claim 3 wherein the contact point between the outer portion of the one piece clamp ring and the disk has substantially no net radial displacement between when the one piece clamp ring first contacts the disk and when the loading mechanism unloads.

5. The disk drive of claim 1 wherein the one piece clamp ring further comprises:

an inner diameter portion;

an outer diameter portion;

a cross member attached to the inner diameter portion and the outer diameter portion, said cross member attached at an angle with respect to the inner diameter portion and the outer diameter portion, said outer member causing said cross member to generate an axial load on the disk stack without having the inner portion of the clamp deflected relative to the outer portion of the clamp.

6. The disk drive of claim 5 wherein the contact point between the outer portion of the one piece clamp ring and the disk has substantially no net displacement from the axis of the ring from when the one piece clamp ring first applies a force to the disk to when the clamp ring is in clamping relation with respect to the disk.

7. The disk drive of claim 6 wherein the inner diameter portion further comprises a hub gripping portion and the outer diameter portion further comprises a disk contact portion.

8. The disk drive of claim 7 wherein the angle between the cross member and the inner portion and outer portion can be varied to vary the axial load the one piece clamp ring applies.

9. The disk drive of claim 1 wherein at least a portion of the clamping ring which grips said hub is between the circular end and said at least one disk.

10. A disk drive comprising:

a hub having a first diameter;

at least one disk having an opening therein, said opening having a second diameter, said first diameter and said second diameter being nearly equal;

a one piece clamp ring for clamping the at least one disk to the hub to form a disk stack in a disk drive and wherein said clamp ring is thermally expanded, placed on at least one disk, and contracted to provide a clamping force, said clamp ring further comprising:

a first portion for gripping the outer surface of the hub at a portion having said first diameter and not extending above an upper surface of the hub;

a second portion, one of the first or second portions being more compliant in an axial direction than the other of said first or second portions; and a disk clamping portion, said second portion attached to said first portion and to said disk clamping portion, wherein the second portion of the clamp ring is attached to the first portion at an angle which slopes downward from the first portion to said disk clamping portion.

11. The disk drive of claim 10 wherein one of said first or second portions of the clamp ring is compressed and applies a clamping load to at least one disk acting through the disk contact portion, said clamping load including a radial component of force directed radially outward from the clamp ring and acting through the disk clamping portion, whereby the component of force acting radially outward from the ring can be varied by varying the angle of attachment between the first portion and the second portion.

12. The disk drive of claim 10 wherein one of said first or second portions of the clamp ring is compressed and applies a clamping load to at least one disk acting through the disk clamping portion, said portion including an axial component of force whereby the axial component of force can be varied by varying the angle of attachment between the first portion and the second portion.

13. The disk drive of claim 10 wherein one of said first or second portions of the clamp ring is compressed and applies a clamping load to at least one disk acting through the disk contact portion, wherein the angle between the first and the second portion is selected to produce a component of force acting radially outward from the ring on the disk which counteracts an inwardly acting radial force placed on the disk at the disk clamping portion as the disk clamping ring engages the disk.

14. The disk drive of claim 10 wherein one of said first or second portions of the clamp ring is compressed and applies a clamping load to the at least one disk acting through the disk clamping portion, wherein the angle between the first and the second portion is selected to produce an axial component of force on the disk as a result of said compression.

15. The disk drive of claim 10, said clamp ring being compressed to apply a clamping load to said at least one disk acting through the disk clamping portion, said clamp ring having a geometry such that the clamp ring returns to substantially the same position with respect to said at least one disk after the clamping load is applied to clamp the disk and the clamp ring contracts from cooling after being thermally expanded, as it had before the clamping load was applied.

16. A disk drive comprising:

a housing;

a spindle shaft mounted to said housing;

a hub attached for rotation to said spindle shaft, said hub including a flange end and a circular end, said hub having an outer diameter;

at least one disk positioned on said flange, said disk having an opening therein which has an inner diameter, the outer diameter of the hub and the inner diameter of the at least one disk being nearly equal; and a one piece clamp ring further including a disk clamping portion and a first portion for gripping the outer surface of the hub at a portion having said outer diameter, wherein a second portion connects the disk clamping portion and the first portion and slopes downward from the first portion to the disk clamping portion, said clamp ring not extending above the circular end of the hub when in the disk clamping position, said clamp ring having a geometry such that when heated to a predetermined temperature, loaded with a predetermined loading force, and cooled, said clamp ring returns to substantially the same position with respect to the disk as it had before the loading force was applied to the clamp ring.

17. The disk drive of claim 16 wherein at least a portion of clamping ring which grips said hub is between the circular end and said at least one disk.

18. A method for applying a one piece clamp ring to the hub of a disk drive to clamp at least one disk to form a disk stack, said clamp ring having an inner diameter portion which includes a hub gripping surface and a cross member attached to said inner diameter portion at an angle, said cross member attached to a disk clamping portion of the one-piece clamp ring, said cross member sloping toward the at least one disk from said hub gripping surface to said disk clamping portion, said method comprising the steps of:

heating the clamp ring to thermally expand the inner diameter portion of the clamp ring to a diameter which is larger than the outside diameter of the hub and to thermally expand the cross member a desired amount;

placing the heated clamp ring around the hub and onto the disk stack so that the disk clamping portion of the one-piece clamp ring is positioned to clamp the disk and so that the hub gripping surface of the clamp ring is positioned to grip the hub below the end of the hub; and placing a predetermined force on at least one portion of the clamp ring, said predetermined force causing the clamping portion of the one-piece disk clamp to move radially outward from the hub substantially the same distance the clamping portion moves radially inward as it contracts while cooling.

19. A method for applying a one piece clamp ring to the hub of a disk drive as described in claim 18 wherein the step of placing a clamping load on one portion of the clamp ring includes placing a load parallel to the axis of the hub on the inner diameter portion of the clamp ring.

20. A disk drive comprising:

a hub including a cylindrical portion having a height z and an outer diameter, a first flange end and a second end;

at least one disk having an opening therein, said opening having an inner diameter which is nearly equal to the outer diameter of the hub;

a one piece clamp ring for clamping the at least one disk to the hub to form a disk stack in a disk drive and wherein said clamp ring is thermally expanded, placed on at least one disk while applying a force onto said clamp ring toward said at least one disk, and contracted to provide a clamping force, said clamp ring further comprising:

a first portion for gripping the outer surface of the hub at a portion having said outer diameter;

a second portion, one of the first or second portions being more compliant in an axial direction than the other of said first or second portions; and a disk clamping portion, said second portion attached to said first portion and to said disk contact portion, said one piece clamp ring being at or below the z height of the hub when in clamping relation with said at least one disk.

21. The disk drive of claim 20 wherein said hub has an outer diameter and said disk has an opening therein having an inner diameter, said first portion of said clamp ring having an inner diameter substantially equal to the outer diameter of the hub and said disk clamping portion having a diameter greater than the inner diameter of said opening in said at least one disk when in clamping relation.

22. The disk drive of claim 20 wherein at least a portion of clamping ring which grips said hub is hub is between the second end and said at least one disk.

23. The disk drive of claim 20 wherein said clamping ring does not extend beyond the height z of said hub.

* * * * *